United States Patent [19]
Stampfl

[11] Patent Number: 5,705,998
[45] Date of Patent: Jan. 6, 1998

[54] METHOD FOR ROUTING TELECOMMUNICATION CALLS IN A NETWORK

[75] Inventor: Robert Stampfl, Hohenkammer, Germany

[73] Assignee: Siemens Aktiengesellschaft, Munich, Germany

[21] Appl. No.: 509,579

[22] Filed: Jul. 31, 1995

[30] Foreign Application Priority Data

Aug. 24, 1994 [DE] Germany .......... 44 30 054.9

[51] Int. Cl.⁶ .......... H04J 3/14; H04M 3/36; H04M 7/00; H04Q 3/66
[52] U.S. Cl. .......... 340/827; 379/219; 379/220; 379/221; 370/216; 370/351; 370/400; 370/406
[58] Field of Search .......... 340/826, 827, 340/825.52; 370/16, 54, 58.1, 94.3, 94.1, 216, 217, 219, 220, 225, 228, 351, 400, 406; 379/219, 220, 221, 272, 273, 240, 242

[56] References Cited

U.S. PATENT DOCUMENTS

| | | | |
|---|---|---|---|
| 4,656,658 | 4/1987 | King | 379/221 |
| 4,931,941 | 6/1990 | Krishnan | 364/437 |
| 5,371,732 | 12/1994 | Brocken et al. | 370/16 |
| 5,537,392 | 7/1996 | Wille et al. | 370/14 |

FOREIGN PATENT DOCUMENTS 42 09 906 C1 10/1993 Germany.

*Primary Examiner*—Michael Horabik
*Assistant Examiner*—Yonel Beaulieu
*Attorney, Agent, or Firm*—Hill, Steadman & Simpson

[57] ABSTRACT

Telecommunication connections that are to be set up are provided with a signaling information (SI) that has an originating information (UI) for identifying the originating node, a destination information (ZI) for identifying the destination node and a network authorization information (NB) for an identification of restricted node connections specifically associated to the transmitting subscriber. Stored in the node itself is a correction information (KI) that can have at least one of inhibit and enable indicators for the node connections dependent on the originating and destination information (UI, ZI) of a telecommunication connection to be set up. A node authorization information is formed in the node controller from the network authorization information (NB) and from the correction information (KI), a node connection to be traversed thereupon by the telecommunication connection that is to be set up being calculated on the basis of this node authorization information. Network loops and inadmissible network interworkings can thus be prevented.

3 Claims, 2 Drawing Sheets

FIG 2

| B ZIELKNOTEN | RT | F ZIELKNOTEN | |
|---|---|---|---|
| A | ab | A | ef, df, cf |
| C | bc, bd1, bd2 | B | ef, df, cf |
| D | bc, bd1, bd2 | C | cf |
| E | be, bd1, bd2 | D | df |
| F | bd1, bd2, be | E | ef, df, cf |

| ZIELKNOTEN \ URSPRUNGSKNOTEN | A | B | C | D | E | F |
|---|---|---|---|---|---|---|
| A | o | o | o | o | o | o |
| B | o | o | o | +bd2 | o | o |
| C | -bd2 | o | o | o | -bc | -be |
| D | -bd2 | +bd2 | o | o | o | o |
| E | -bd2 | o | -be | o | o | -bc |
| F | -bd2 | o | o | o | o | o |

F — KI

| ZIELKNOTEN \ URSPRUNGSKNOTEN | A | B | C | D | E | F |
|---|---|---|---|---|---|---|
| A | o | o | o | o | -cf | o |
| B | o | o | -ef | +bd2 | -cf | o |
| C | -ef | -ef | o | o | -cf | o |
| D | o | +bd2 | -ef | o | -cf | o |
| E | -cf | -cf | -ef | o | o | o |
| F | o | o | o | o | o | o |

METHOD FOR ROUTING TELECOMMUNICATION CALLS IN A NETWORK

BACKGROUND OF THE INVENTION

The present invention is directed to a method for routing telecommunication connections in a network, whereby the telecommunication connections are routed from a telecommunication equipment of the transmission side to an originating node and are routed to a destination node on node connections via transit nodes.

A network of this type is formed by a plurality of respectively autonomous information systems, for example communication or switching systems, that are referred to as nodes of the network and that can transmit information to other nodes and receive information from them. A meshed network occurs when nodes having at least two further nodes are connected. A network is fully meshed when each node is directly connected to every other node of the network.

For routing telecommunication connections, there is the risk in a meshed network that a loop formation is established at what are referred to as trunk bottlenecks, whereby a respective node connection is to be understood as a trunk. When the trunk bottleneck that led to the loop formation is not eliminated, then the telecommunication connection runs through the loop until all trunk elements have been occupied.

German Letters Patent DE 42 09 906 discloses a method for routing telecommunication connections in a meshed network. In this method, an auxiliary information that respectively identifies the destination node and the originating node is inserted into the signaling information allocated to the telecommunication connection to be set up. The node to be traversed following immediately thereupon is respectively identified in a node on the basis of this auxiliary information. The risk of a loop formation can be diminished with this measure. The risk of network loops can be completely precluded in a version of the known method when a third auxiliary information that identifies the traversed nodes is inserted into the signaling information of the telecommunication connection by every node to which the telecommunication connection has led. This third auxiliary information is then additionally utilized in the nodes in order to identify the nodes to be traversed following immediately thereupon for a telecommunication connection. The successive lengthening of the signaling information that occurs in this method can definitely cause problems.

Although network loops can be reliably avoided with this latter version of the method, it cannot, in particular, satisfy the demands in view of networks that are composed of nodes of different operators. It is not a rare occurrence given such network configurations that the operators of one or more nodes have not entered into a use agreement with all other node operators. In order to be able to assure in such instances that the setup of a telecommunication connection is not routed via a node or, respectively, a node connection whose use is not permitted for the subscriber initiating the telecommunication connection, it is necessary to insert an authorization information belonging to the subscriber into the signaling information of the telecommunication connection. This authorization information identifies the nodes or, respectively, node connections that cannot be utilized in setting up the appertaining telecommunication connection, that is, the nodes or, respectively, node connections that are closed for the telecommunication connection that is to be set up. The authorization information in this form, however, cannot serve the purpose of avoiding loops since it is linked only to the individual subscribers and does not take the network topology into consideration.

SUMMARY OF THE INVENTION

It is an object of the present invention to provide a method for a routing that is suitable for a network having different node operators and whereby an increase in the signaling information by information that identify the traversed nodes is avoided and a loop formation is nonetheless prevented early.

This object is inventively achieved by a method for routing telecommunication connections in a network having nodes. The method has the steps of: routing the telecommunication connections from a terminal equipment of a transmission side to an originating node; routing the telecommunication connections from the originating node to a destination node on node connections via transit nodes; inserting an originating information, a destination information for identifying the destination node, and a network authorization information for identifying node connections that cannot be used for a telecommunication connection that is to be set up into a signaling information of a telecommunication connection that is to be set up; storing a respective correction information in the nodes that, dependent on the originating and destination information of a telecommunication connection that is to be set up have at least one of inhibit and enable indicators at least for immediately connected node connections; storing respective routing information in nodes that, dependent on the destination node of a telecommunication connection that is to be set up, identifies the immediately connected node connections pointing in the direction of the destination node; and forming a node authorization information from the network authorization information and from at least one of inhibit and enable indicators for a telecommunication connection that is to be set up, a further node connection to be subsequently traversed by the telecommunication connection that is to be set up being calculated based on the node authorization information from the routing information.

It is an advantage of the inventive method that the implementation thereof requires neither a modification of the network structure nor changes in the hardware structure of the network nodes that, in particular, are fashioned as switching centers. A control program implemented in the network nodes, which serves for the execution of the method of the present invention, is identical for all network nodes since the same method steps are implemented in all nodes.

Another important advantage of the inventive method is the flexibility lent by the inventive method, with which potential changes in the operator situation can be taken into consideration with extremely little outlay, particularly given changes in agreements between the operators.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 2 are tables for illustrating the route information in the nodes B and F of FIG. 1a; and FIG. 3 are tables for illustrating the correction information in the nodes B and F of FIG. 1a.

DESCRIPTION OF THE PREFERRED EMBODIMENTS

Figure 1A:
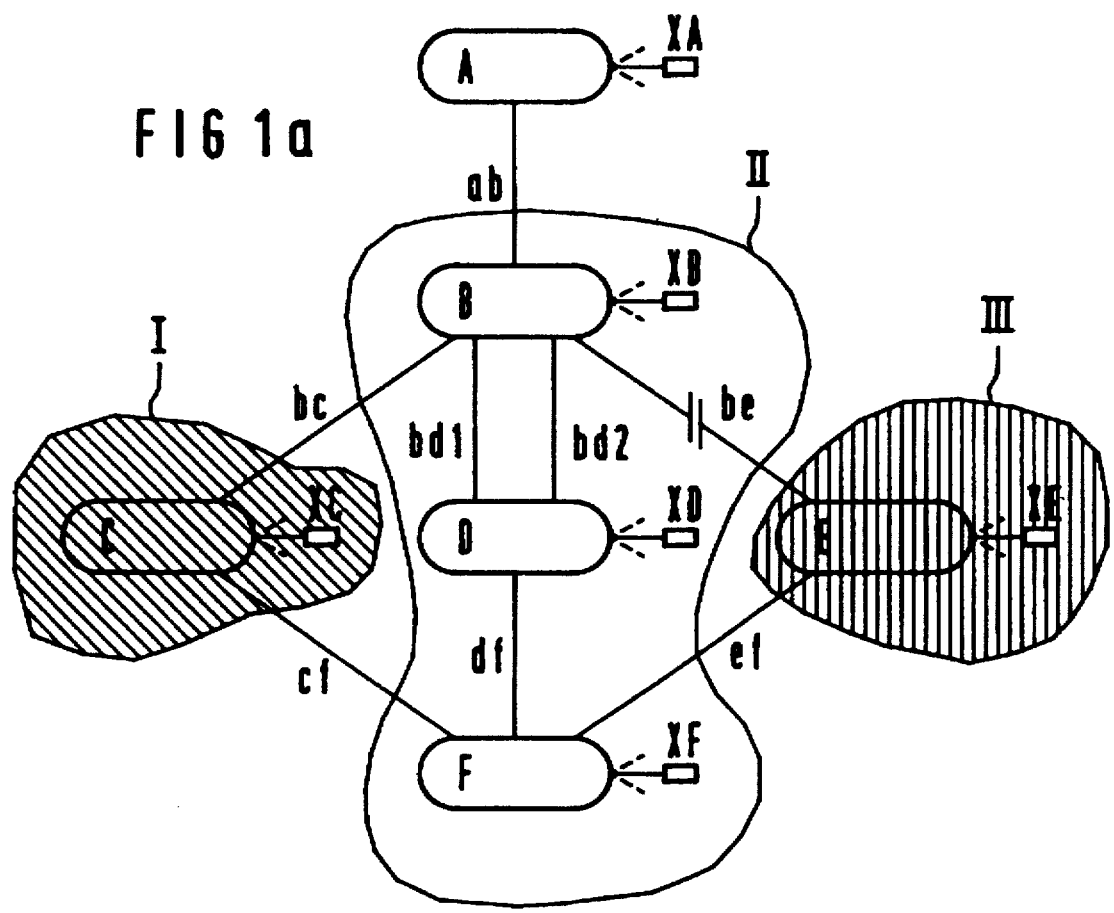
FIG. 1a depicts an information network having nodes and node connections.

FIG. 1a symbolically shows an information network having a plurality of nodes A, B, C, D, E, F that are connected to one another via node connections. Each of the illustrated nodes represents a communication system, particularly a telephone switching system, to which a respective plurality of internal subscriber equipment, for example telephone terminal equipment, telefax equipment, etc., are connected. Respectively one subscriber equipment XA, XB, . . . , XF is shown in the drawing representing the connected subscriber equipment. The illustrated node connections, for example ab, bc, be, etc., are respectively realized by what is referred to as a trunk group composed of a plurality of line or trunk elements.

The nodes in the illustrated network are allocated to different operators, that is, private communication systems of several companies, for example, are connected to one another by the network. The node C thus belongs to operator I, the nodes B, D, F belong to operator II and the node E belongs to operator III. The node A stands for a public switching system.

In a telecommunication connection that is to be set up from the subscriber equipment XA to the subscriber equipment XE, the node A has the function of an originating node and the node E has the function of a destination node. Further nodes participating in the setup of the telecommunication connection are referred to as transit nodes.

For example, a telecommunication connection can be set up between the subscriber equipment XA and XE via the transit nodes B, D and F or via the transit nodes B, C, F. The different possibilities derive due to the meshed structure of the network and due to a corresponding configuring of the network nodes.

For identification of the nodes, an individual node call number (not shown) is allocated to every node in the network. Upon setup of a telecommunication connection, the call number of the subscriber equipment XE of the reception side is input in the subscriber equipment XA of the transmission side. This call number is composed of a node call number indicating an extension area and of an extension number indicating the subscriber terminal of the reception side, that is, the subscriber equipment XE of the reception side.

Figure 1B:
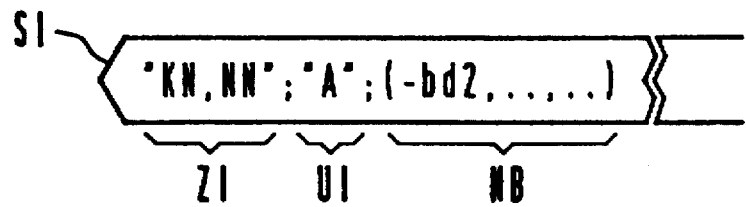
FIG. 1b depicts a signaling information.

FIG. 1b shows the content of a signaling information SI belonging to a telecommunication connection that is to be set up. This signaling information SI has a destination information ZI identifying the subscriber terminal of the reception side that, as set forth above, consists of a call number that is composed of a node call number KN of the destination node and of an extension number NN of the subscriber terminal of the reception side. Further, the signaling information SI has an originating information UI that identifies the originating node and also has a network authorization information NB in which are identified those node connections that cannot be used, that is, those node connections that are considered to be closed, for the appertaining telecommunication connection that was initiated by a subscriber at the terminal equipment XA.

Given a setup of a telecommunication connection between the subscriber equipment XA and XE, the telecommunication connection, including its signaling information SI, in the network configuration provided in the present exemplary embodiment is supplied first to the transit node B proceeding from the originating node A.

The nodes each respectively have a controller, each of which, using a plurality of information that shall be discussed in greater detail below, identifies the node to be immediately traversed next, the immediately next node connection in the direction of the destination node for the telecommunication connection.

A first information type used in the prior art is referred to as routing information. A routing information is stored, for example in the form of a table, in every node, the technically allowable, that is, possible node connections that are directly connected to the appertaining node being indicated therein exclusively dependent on the destination node. The neighboring nodes that can be directly reached via the node connections can also be recited instead of the node connections.

FIG. 2 shows the routing information RT for the node B (left-hand side) and for the node F (right-hand side) from FIG. 1A, each respectively in the form of a table.

When, for example at the node B, a telecommunication connection having a signaling information SI arrives whose destination information ZI identifies the node A, then only one possible node connection (namely "ab") can be identified from the routing information RT. When, for example, the node E is identified as destination node, the routing information RT indicates three possible node connections to be traversed immediately following the node B; according to the example, the node connections be, bd1, bd2.

The routing information RT stored in the node F indicates only the node connection cf for the destination node C and indicates the node connections ef, df and cf as being allowed to the destination node E. The routing information RT, which is fashioned and stored associated to an individual node, is produced essentially on the basis of technical aspects. The routing information RT is thus independent of the operator situation, of potential loop formations and of authorizations. The routing information RT in the nodes of a network usually only have to be modified when nodes and node connections are added to the network or, respectively, when these are removed from the network.

A respective correction information KI is stored in the nodes as a further information type, this can have inhibit or enable indicators (at least for node connections immediately connected to the appertaining node) dependent on the originating and destination nodes identified in conjunction with the telecommunication connection that has arrived.

The correction information KI are respectively shown in the form of a matrix for the nodes B and F in FIG. 3. Inhibit indicators are marked with a "−", and enable indicators are marked with a "+". The matrix (left-hand side) belonging to the node B has a plurality of inhibit indicators, for example the node connection bd2 is inhibited for a telecommunication connection that has the originating node A and the destination nodes C, D, E or F. Further, the node connection be is inhibited for a connection that has the originating node F and the destination node C, and the node connection bc is inhibited for a telecommunication connection having the originating node F and the destination node E.

The matrix (right-hand side) allocated to the node F contains inhibit indicators for the node connection ef for telecommunication connections having the destination node C and the originating nodes A or B. The node connection cf is inhibited for telecommunication connections having the destination of E and the originating nodes A or B. Likewise, the node connection cf is inhibited for telecommunication connections having the originating node E and the destination nodes A, B, C or D.

Of course, a plurality of enable and/or inhibit indicators for node connections leading away from the appertaining node can be stored as warranted at the intersecting points of the matrix.

The correction information KI is usually entered into the nodes when the network is installed. The correction information KI serves the purpose of node-associated correction of the network authorization information NB contained in the signaling information SI of a telecommunication connection that is to be set up, that is, the network authorization information NB, together with the correction information KI that can have inhibit or, respectively, enable indicators dependent on the originating and destination of the telecommunication connection, is used for forming a node authorization information that refers exclusively to the node.

In addition to the inhibit indicators contained in the network authorization information NB, further inhibit indicators recited in the correction information KI are transferred into the node authorization information. However, an inhibit indicator contained in the network authorization information NB for a node connection is not transferred into the node authorization information on the basis of an enable indicator stored in the correction information KI for the same node connection.

The correction information KI for the nodes is produced by a network administrator and is forwarded to every node for storing upon initialization of the network. On the basis of a known method, possible loop formations in the routing are prevented in the production of the correction information KI in that, given an existing network topology, those node connections considered for each node that lead to a loop are given inhibit indicator dependent on the originating and destination nodes of a telecommunication connection.

When, for example, a telecommunication connection has arrived at the node F and the node B is identified as originating node and the node E is identified as destination node in the node F, an inhibit indicator for the node connection cf is found in the correction information KI of the node F since this node connection cf leads back to the node B via the node C and a loop is thus produced. In and of itself, the routing information RT allows this path, particularly when the node connection be is, for example, interrupted and the node connection ef is overloaded.

Compared thereto, a telecommunication connection that arrives at node F and that has the node E as destination node and the node D as originating node should be routed via the node connection cf without an immediate loop risk.

A further aspect in the production of the correction information KI takes into consideration that the nodes in a network are allocated to different operators and the operators have made specific use agreements. In the network of FIG. 1a, for example, the operator I has made a use agreement with the operator II and the operator II has made a use agreement with the operator III. There is thus no use agreement between the operator I and the operator III. When, for example, a telecommunication connection is to be set up from the node E to the node B and the direct node connection be is down, then the telecommunication connection arrives at the node F. When the node D is also down, then the only possible node connection cf that was still remain would lead to the operator I who has no agreement with the operator of the node E. An inhibit indicator for the node connection cf is therefore stored in the correction information KI of the node F.

It is also taken into consideration when producing the correction information KI that node connections can be established in a network on which specific transmission procedures are implemented. For example, voice compression is implemented on the node connection bd2 between the nodes B and D. An existing demand, however, states that no trunk calls can be routed via a trunk on which voice compression is implemented.

Given the assumption that the node A represents the public network in FIG. 1a, a telecommunication connection from the node A to the node D cannot be routed via the node connection bd2. An inhibit indicator is therefore deposited for the node connection bd2 in the network authorization information NB of the signaling information SI indicated by way of example in FIG. 1b.

In another telecommunication connection that is to be routed from the subscriber equipment XA at the node A (which again represents the public network) to the subscriber equipment XB at the node B, no inhibit indicator is required in the network authorization information NB of a signaling information SI belonging to the telecommunication connection. When, however, the subscriber equipment XB has initiated a call rerouting to the subscriber SD at the node D, the rule applies that, in case of a call rerouting, the network authorization of the subscriber initiating the call rerouting overwrites the network authorization information of the subscriber initiating the telecommunication connection. In the example discussed above, no inhibit indicator for the node connection bd2 is provided for the subscriber at the terminal equipment XB, an inhibit indicator for the node connection bd2 must thus be stored in the correction information KI of the node B in those instances wherein the originating node is A and the destination node is, for example, D or F.

An occasional redundancy between network authorization information NB and correction information KI can occur. Fundamentally, however, the network authorization information NB is linked to the individual subscriber or, respectively, the subscriber equipment thereof and does not take the topology of the network into consideration. The correction information KI takes higher-ranking routing points of view (network loops, unallowed network interworkings, etc.) into consideration and is not directed to the individual subscriber or, respectively, his authorization.

The node controller that has already been mentioned and that is provided in the nodes and that can be fashioned in conformity with the initially cited prior art in terms of its structure, first evaluates the signaling information SI of the appertaining telecommunication connection. The destination information that identifies the destination node is calculated from the node call number KN and from the extension number NN. The node controller obtains the information about the originating node from the originating information UI and the inhibited node connections are read from the network authorization information NB. Subsequently, the inhibit and enable indicators entered for the originating and destination nodes are read from the correction information KI stored in the appertaining node, whereby a node authorization information is formed together with the inhibit indicators stored in the network authorization information NB.

After calculating the node authorization information, the node controller calculates the possible node connections to be traversed in direct sequence to the appertaining node in the routing information RT stored in the appertaining node dependent on the destination node identified in the destination information. When node connections are thereby encountered for which inhibit indicators are contained in the node authorization information, these node connections are no longer treated as possible routes. One node connection, for example the node connection cited first, is selected from the remaining node connections, and the telecommunication connection is forwarded on this node connection to the immediately next node, whereby the destination information ZI, the originating information UI and the network authorization information NB present upon arrival of the telecommunication connection are forwarded in the signaling information SI.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for routing telecommunication connections in a network having nodes, comprising the steps of:

routing the telecommunication connections from a terminal equipment of a transmission side to an originating node;

routing the telecommunication connections from the originating node to a destination node on node connections via transit nodes;

inserting an originating information, a destination information for identifying the destination node, and a network authorization information for identifying node connections that cannot be used for a telecommunication connection that is to be set up into a signaling information of a telecommunication connection that is to be set up;

storing a respective correction information in the nodes that, dependent on the originating and destination information of a telecommunication connection that is to be set up have at least one of inhibit and enable indicators at least for immediately connected node connections;

storing a respective routing information in the nodes that, dependent on the destination node of a telecommunication connection that is to be set up, identifies the immediately connected node connections pointing in a direction of the destination node; and forming a node authorization information from the network authorization information and from said at least one of the inhibit and enable indicators for a telecommunication connection that is to be set up, a further node connection to be subsequently traversed by the telecommunication connection that is to be set up being calculated based on said node authorization information from the routing information.

2. A method for routing telecommunication connections in a network having nodes, the telecommunication connections being routed from a terminal equipment of a transmission side to an originating node, and the telecommunication connections then being routed from the originating node to a destination node via transit nodes, the method comprising the steps of:

inserting originating information, destination information for identifying the destination node, and network authorization information for identifying node connections that cannot be used for a telecommunication connection into signaling information for a telecommunication connection that is to be set up;

storing correction information in the nodes that, dependent on the originating information and destination information of the telecommunication connection, have at least one of an inhibit indicator and an enable indicator at least for directly connected node connections;

storing routing information in the nodes that, dependent on the destination node of the telecommunication connection, identifies the directly connected node connections pointing in a direction of the destination node; and forming node authorization information from the network authorization information and from at least one of the inhibit indicator and the enable indicator for the telecommunication connection, a further node connection to be subsequently traversed by the telecommunication connection being calculated based on said node authorization information from the routing information.

3. A method for routing telecommunication connections in a network having nodes, the telecommunication connections being routed from a terminal equipment of a transmission side to an originating node, and the telecommunication connections then being routed from the originating node to a destination node via transit nodes, the method comprising the steps of:

inserting originating information, destination information for identifying the destination node, and network authorization information for identifying node connections that cannot be used for a telecommunication connection, that is to be set up from an originating node to a destination node, into signaling information for the telecommunication connection that is to be set up;

storing correction information in the nodes that, dependent on the originating information and the destination information of the telecommunication connection have at least one of an inhibit indicator and an enable indicator at least for directly connected node connections;

storing routing information in the nodes that, dependent on the destination node of the telecommunication connection, identifies the directly connected node connections that indicate a direction of the destination node; and forming node authorization information from the network authorization information and from said at least one of the inhibit indicator and the enable indicator for the telecommunication connection, a further node connection for the telecommunication connection being determined, based on said node authorization information, from the routing information.

* * * * *